(12) United States Patent
Beltran

(10) Patent No.: US 11,542,914 B2
(45) Date of Patent: Jan. 3, 2023

(54) POWER GENERATOR WITH MULTIPLE TURBINE UNITS

(71) Applicant: Jose Leon Beltran, Pleasant Grove, UT (US)

(72) Inventor: Jose Leon Beltran, Pleasant Grove, UT (US)

(*) Notice: Subject to any disclaimer, the term of this patent is extended or adjusted under 35 U.S.C. 154(b) by 0 days.

(21) Appl. No.: 17/550,582

(22) Filed: Dec. 14, 2021

(65) Prior Publication Data

US 2022/0186704 A1    Jun. 16, 2022

Related U.S. Application Data

(60) Provisional application No. 63/126,315, filed on Dec. 16, 2020.

(51) Int. Cl.
    *F03B 17/04*      (2006.01)
    *F03G 7/10*      (2006.01)

(52) U.S. Cl.
    CPC .............. *F03B 17/04* (2013.01); *F03G 7/104* (2021.08); *F05B 2240/122* (2013.01)

(58) Field of Classification Search
    CPC ..................... F03G 7/10–135; F03B 17/02–04
    See application file for complete search history.

(56) References Cited

U.S. PATENT DOCUMENTS

| | | |
|---|---|---|
| 3,857,242 A | 12/1974 | Gilmore |
| 4,718,232 A | 1/1988 | Willmouth |
| 5,944,460 A | 8/1999 | Forrest |
| 7,134,283 B2 | 11/2006 | Villalobos |
| 7,765,804 B2 | 8/2010 | Davis |
| 8,015,807 B1 | 9/2011 | Akutsu |
| 8,171,729 B2 | 5/2012 | O'Briant |
| 8,358,021 B2 | 1/2013 | Chow |
| 8,430,172 B1 | 4/2013 | Smith et al. |
| 8,453,442 B1 | 6/2013 | Tran |
| 8,516,812 B2 | 8/2013 | Manakkattupadeettathil |
| 8,756,932 B2 | 6/2014 | Pirincci |
| 10,156,222 B2 | 12/2018 | Westmoreland |

(Continued)

FOREIGN PATENT DOCUMENTS

| | | | | |
|---|---|---|---|---|
| GB | 2269635 A | * | 2/1994 | ............. F03B 17/04 |
| KR | 20160020059 A | * | 2/2016 | |

*Primary Examiner* — Laert Dounis
(74) *Attorney, Agent, or Firm* — John Rizvi; John Rizvi, P.A.—The Patent Professor®

(57) ABSTRACT

A power generator having an impeller configured to facilitate the translation of balls through a ball-actuated turbine and facilitate the transfer of water to drive a water-actuated turbine. The impeller is located within a fluid compartment and creates a turbulent water flow, which generates an inverted vortex. The impeller includes a central bore having an outlet communicating with the fluid compartment and an inlet communicating with a feed space. An array of balls is supplied to the impeller bore via the feed space and traverses the bore in response to the vortex. The balls ascend through the fluid compartment and an upper water tank. At a higher elevation, the ascending balls are routed downstream via gravity to the ball-actuated turbine, while water is routed downstream via gravity to the water-actuated turbine. After performing their respective turbine-driving actions, the water and balls recirculate to the feed space to repeat the cycle.

20 Claims, 14 Drawing Sheets

(56) References Cited

U.S. PATENT DOCUMENTS

| | | |
|---|---|---|
| 2009/0127866 A1 | 5/2009 | Cook |
| 2010/0223922 A1 | 9/2010 | McGahee |
| 2012/0119508 A1 | 5/2012 | Sparks |
| 2012/0198833 A1 | 8/2012 | Francis |
| 2012/0312008 A1 | 12/2012 | Campos Alvarez |
| 2014/0196450 A1 | 7/2014 | Boyd et al. |
| 2015/0267677 A1 | 9/2015 | Imaya |
| 2017/0101976 A1 | 4/2017 | Park |
| 2019/0055915 A1 | 2/2019 | Townsend, IV |

* cited by examiner ically-driven turbine unit. The power generator cell that incorporates an impeller unit to power a ball-actuated, mechanically-driven turbine unit and to power a hydraulically-driven turbine unit.

POWER GENERATOR WITH MULTIPLE TURBINE UNITS

CROSS-REFERENCE TO RELATED APPLICATIONS

This application claims the benefit of U.S. Provisional Patent Application Ser. No. 63/126,315 filed on Dec. 16, 2020, which is incorporated herein in its entirety.

FIELD OF THE INVENTION

The present invention relates generally to power generators, and more particularly, to an integrated power generator cell that incorporates an impeller unit to power a ball-actuated, mechanically-driven turbine unit and to power a hydraulically-driven turbine unit.

BACKGROUND OF THE INVENTION

There are different methods of categorizing energy—potential versus kinetic, type of energy, method of extraction, etc. When comparing renewable and nonrenewable energy, the method by which the energy is extracted creates the difference. According to the U.S. Energy Information Administration, renewable energy is generated from resources that are naturally replenishing but whose energy per unit time is its limiting factor. Examples of renewable energy include solar, wind, hydro, geothermal, and biomass. Conversely, nonrenewable energy is obtained from resources that either do not naturally replenish or replenish too slowly to be realistically replaced. Examples of nonrenewable energy include mostly fossil fuels, such as coal, petroleum, and natural gas.

Although nonrenewable energy is superior in energy production per unit time, it is unsustainable for different reasons. As stated previously, the resources that produce nonrenewable energy will eventually deplete, while the global average per capita energy consumption has consistently increased. Between 1970-2014, average consumption has increased by approximately 45 percent according to Our World in Data.

A second reason for the unsustainability of nonrenewable resources relates to pollution. Carbon dioxide is the primary greenhouse gas emitted into the environment. Greenhouse gas is a major contributor to climate change, a serious environmental threat capable of impacting life on Earth through more frequent and extreme heat waves, droughts, storms, and spread of disease. The main human activity that emits carbon dioxide is the combustion of fossil fuels for energy and transportation, as disclosed by the United States Environmental Protection Agency. Therefore, changing the major source of energy acquisition from fossil fuels to renewable energy (clean energy) is critically important.

However, growth in the renewable energy sector has barely kept pace with the increased global demand for electricity. For example, fossil fuels provided about 70 percent of global electricity in 1980 and 65 percent in 2010. Despite the use of nuclear power in the 1980s, technology providing substantial improvement in acquiring energy from renewable resources has remained stagnant—yet the use of depleting resources has increased to keep up with demand.

This is not to say important technological advancements have not been made, but they tend to lack efficiency of energy acquisition from renewable resources. For example, a diversion facility is a type of hydroelectric plant that channel the flow of water toward power-generating turbines. The power cells where the turbines are contained consist of a multitude of mechanical parts, resulting in a system with an inherent efficiency deficiency.

Therefore, there is an unmet need for technological advancements capable of sustainably and efficiently making use of renewable energy in face of the stagnation affecting the sector. Namely, there is an established need for a power generator cell that offers increased energy efficiency by transforming the energy input into multiple energy output pathways each driving and powering a separate turbine unit.

SUMMARY OF THE INVENTION

The present invention is directed to a power generator system that employs a ball-actuated, mechanically-driven turbine unit and a hydraulically-driven turbine unit. The system includes a lower stage defining an upstream location, an upper stage disposed above the first stage and defining a downstream location, and an intermediate stage disposed between the lower stage and the upper stage. All of these stages are housed in a tower-like structure. In one form, the intermediate stage defines a water-fillable container space. A fluid pathway is formed that communicates from the lower stage to the upper stage via the intermediate stage. The system includes a ball-actuated turbine generator and a water-actuated turbine generator connected to the upper stage. A ball-conveying channel communicates between the upper stage and the lower stage via the ball-actuated turbine generator. A water-conveying channel communicates between the upper stage and the lower stage via the water-actuated turbine generator. The system incorporates at least one ball each configured to drive the ball-actuated turbine generator. A water source supplies water to the lower stage via the water-conveying channel at a location downstream of the water-actuated turbine generator. The lower stage includes a vortex chamber or hydro reactor defining a space. An impeller is housed in the hydro reactor and includes a rotary hub that carries a series of blades or vanes. The rotary hub includes a central bore or passageway having an inlet and an outlet. The central passageway outlet is disposed in communication with the hydro reactor space, while the inlet is disposed in communication with both the water-conveying channel (to receive water therefrom) and the ball-conveying channel (to receive any available balls therefrom). In operation, the impeller generates a vortex within the space of the hydro reactor.

The impeller is configured to generate a vortex using the available water present in the hydro reactor space. The vortex is sufficient to effectively create a pressure differential at the mouth or outlet of the impeller central passageway such that any of the balls present at the inlet are drawn upwards and advanced into the vortex chamber space via the impeller central passageway. The vortex is further sufficient such that the uplifted water and balls experience sufficient vortex-induced hydraulic propulsion to ascend and reach the upper stage via the fluid pathway through the intermediate stage. The generated vortex effectively moves and otherwise displaces the water and balls from a lower elevation (downstream location) to a higher elevation (upstream location). The upper stage is configured to receive water from the fluid pathway and route the received water into the water-conveying channel, where the water flows downwards under gravity assistance to drive and power the water-actuated turbine generator. The upper stage is further configured to receive the ascending balls from the fluid pathway and route the received balls into the ball-conveying channel, where the balls flow downwards under gravity assistance to drive and power the ball-actuated turbine generator. The output mechanical energy from both the water-actuated turbine generator and the ball-actuated turbine generator is converted by an electrical generator into useful electrical energy.

Introducing a first embodiment of the invention, the present invention consists of a power generator system, comprising:

a water receptacle arrangement defining a water environment, the water receptacle arrangement including an upper end, a lower end, a water-fillable enclosure defining an upper reservoir space, and a hydro chamber defining a lower reservoir space;

an impeller housed in the chamber of the water receptacle arrangement, the impeller having a bore extending between an inlet end to an outlet end thereof, the impeller outlet end disposed in fluid communication with the lower reservoir space;

a water-conveyance arrangement configured at least in part to define a fluid-communicating pathway between the upper end and the lower end of the water receptacle arrangement;

a water-driven first turbine configured to be operably driven by water traversing the water-conveyance arrangement;

at least one ball;

a ball-conveyance arrangement configured at least in part to define a ball-communicating pathway between the upper end of the water receptacle arrangement and the inlet end of the impeller bore; and a ball-driven second turbine configured to be operably driven by any of the at least one ball traversing the ball-conveyance arrangement;

the impeller configured to operably generate a vortex, wherein the vortex generated by the impeller is sufficient to assist at least one ball ingressing the impeller to communicate through the impeller bore from the inlet end to the outlet end thereof and to assist at least one ball egressing the impeller to communicate from the impeller outlet end to the upper end of the water receptacle arrangement via the lower reservoir space and the upper reservoir space.

In another form, the present invention consists of a method of generating power, comprising the steps of:

providing an impeller within a water environment having an upper end and a lower end, the impeller having a bore extending between an inlet end and an outlet end thereof;

providing at least one ball;

directing the at least one ball to the impeller bore;

causing the impeller to generate a vortex sufficient to assist any ball ingressing the impeller to communicate through the impeller bore from the inlet end to the outlet end thereof and to egress into the water environment;

defining a ball recirculation path facilitating the transfer of a ball, experiencing a gain in elevation through the water environment in response to at least one of buoyancy and the influence of the vortex generated by the impeller, to the impeller at the inlet end thereof;

causing a ball traversing the ball recirculation path to drive a ball-actuatable turbine;

defining a water recirculation path facilitating the transfer of water from the upper end to the lower end of the water environment; and causing water traversing the water recirculation path to drive a water-actuatable turbine.

In yet another form, the present invention consists of a power generator system, comprising:

a water environment including an upper end, a lower end, an upper reservoir space, and a lower reservoir space defining a hydro chamber;

an impeller housed in the hydro chamber and configured to operably generate a vortex, the impeller having a longitudinal bore extending between an inlet end and an outlet end thereof and defining a ball-communicating passageway, the outlet end of the impeller disposed in fluid communication with the water environment at the lower reservoir space thereof;

a water-conveyance system configured at least in part to define a fluid-communicating pathway between the upper end and the lower end of the water environment;

a hydraulically-actuated first turbine configured to be operably actuated by water traversing the fluid-communicating pathway;

at least one ball;

a ball-conveyance system configured at least in part to define a ball-communicating pathway between the upper end of the water environment and the impeller bore at the inlet end thereof; and a ball-actuated second turbine configured to be operably actuated by any of the at least one ball traversing the ball-communicating pathway;

wherein the vortex generated by the impeller is effective to assist any ball encountering the impeller at the inlet end thereof to communicate through the impeller bore from the inlet end to the outlet end thereof;

wherein at least one ball egressing the impeller at the outlet end thereof experiences an ascension through the water environment from the lower reservoir space to the upper reservoir space in response to at least one of buoyancy and the impelling influence of the vortex generated by the impeller.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
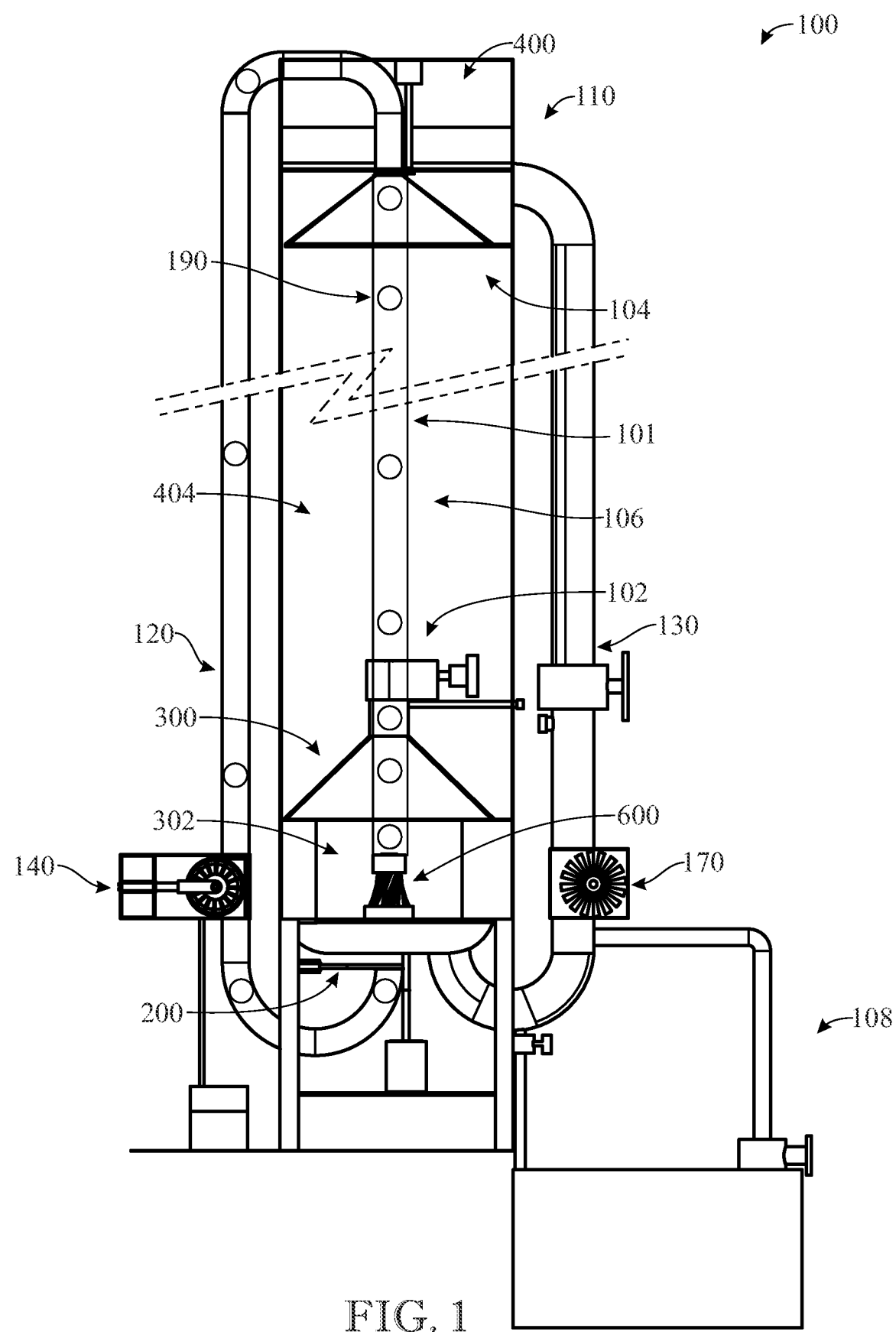
FIG. 1 presents a front elevation, interior diagrammatic view showing a first embodiment of the power generator cell of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a power generator that deploys a ball-actuated, mechanically-driven turbine unit and a water-actuated, hydraulically-driven turbine unit. A jet type impeller forms a vortex to generate an uplift action that induces a mixture of water and balls to experience a change of elevation, thereby increasing the potential energy of the rising water and the ascending balls. A common pathway is used to transport the mixture of water and floatable balls from the area of the jet impeller to a higher elevation. At the higher elevation, the balls are extracted from the mixture and routed downstream to a ball-actuated turbine generator located at a lower elevation, where the acquired kinetic energy of the balls (equivalent to the change in potential energy accompanying the change in elevation) drives the ball-actuated turbine generator. Additionally, at this higher elevation, the received water is routed downstream to a water-actuated turbine generator located at a lower elevation, where the acquired kinetic energy of the water drives the water-actuated turbine generator. The turbine generators are configured to recirculate the water and balls back to the jet impeller to repeat the power generation cycle. The output mechanical energy from the water-actuated turbine generator and the ball-actuated turbine generator (e.g., the kinetic energy of the rotating shafts) is converted by an electrical generator into useful electrical energy.

Figure 7:
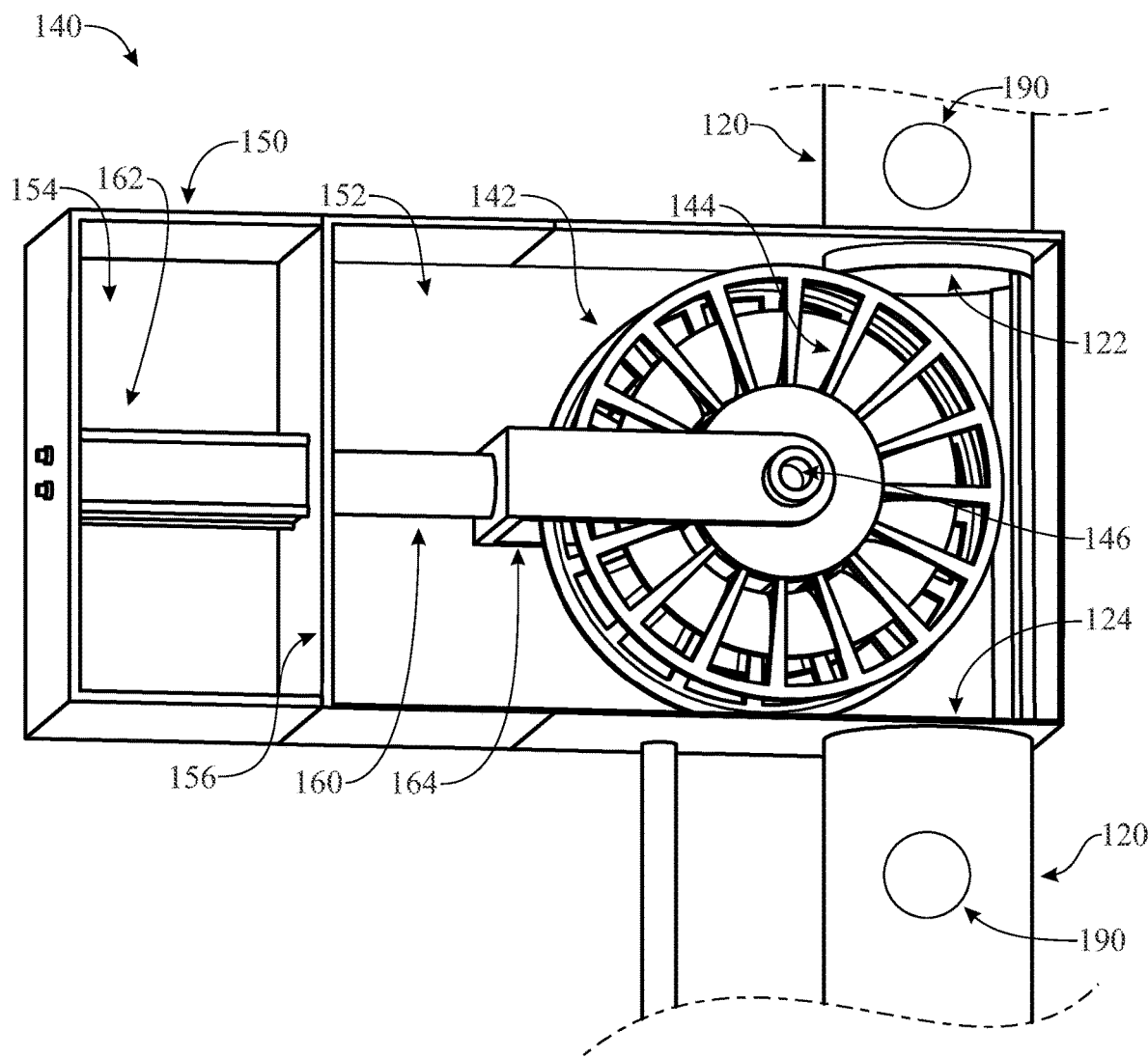
FIG. 7 presents a front perspective, sectional, interior diagrammatic view of the ball-actuated turbine generator of the first embodiment of the power generator cell of the present invention.
Figure 8:
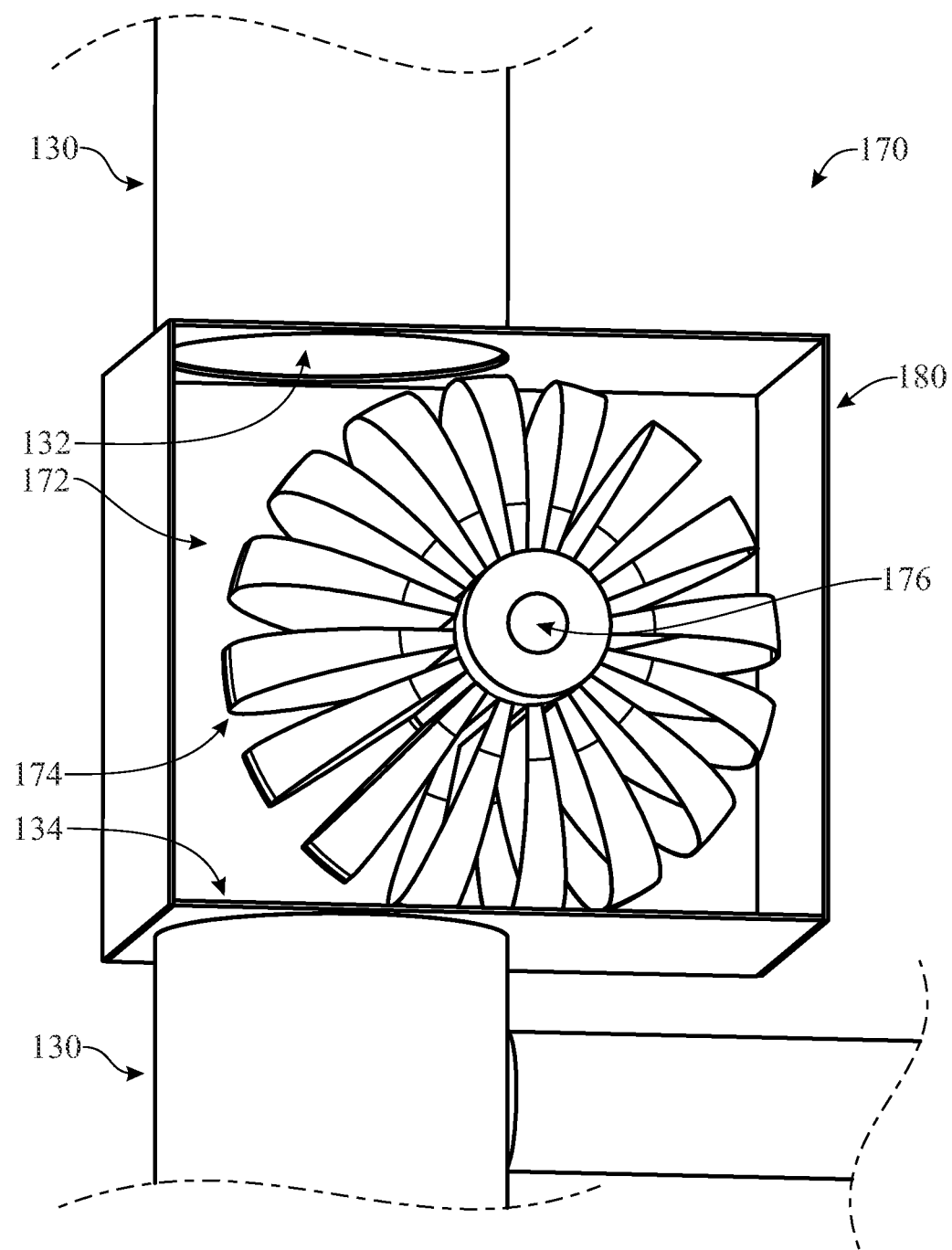
FIG. 8 presents a front perspective, sectional, interior diagrammatic view of the water-actuated turbine generator of the first embodiment of the power generator cell of the present invention.

Referring initially to FIG. 1, a power generator cell 100 is disclosed according to a first embodiment of the present invention. The cell 100 includes a lower-level input stage generally illustrated at 102 (FIGS. 2-4), an upper-level output stage generally illustrated at 104 (FIGS. 5-6), and an intermediate transition stage generally illustrated at 106 that connects the lower-elevation input stage 102 to the higher-elevation output stage 104. The cell 100 is connected to a water supply source generally illustrated at 108. The various stages 102, 104, 106 are housed in a tower structure or building generally illustrated at 110. An impeller 600 located in the input stage 102 (FIG. 3) generates a vortex within the water-filled space of chamber 302 where impeller 600 is housed. The impeller 600 functions in part to facilitate the circulation of a set of spherical objects or balls 190. The balls 190 experience a vortex-induced and/or vortex-assisted interaction or influence that helps to urge, drive and otherwise propel balls 190 in an upward movement or ascension through the water-filled contents of intermediate stage 106. At output stage 104, the ascending or rising balls 190 are routed through a down-turning pipe 120 and experience a gravity-assisted drop in elevation to mechanically drive a first turbine 140 (FIG. 7). Additionally, at output stage 104, water is routed through another down-turning pipe 130 and experiences a gravity-assisted drop in elevation to hydraulically drive a second turbine 170 (FIG. 8). The impeller 600, turbine 140, and turbine 170 define an arrangement of turbomachines.

Figure 2:
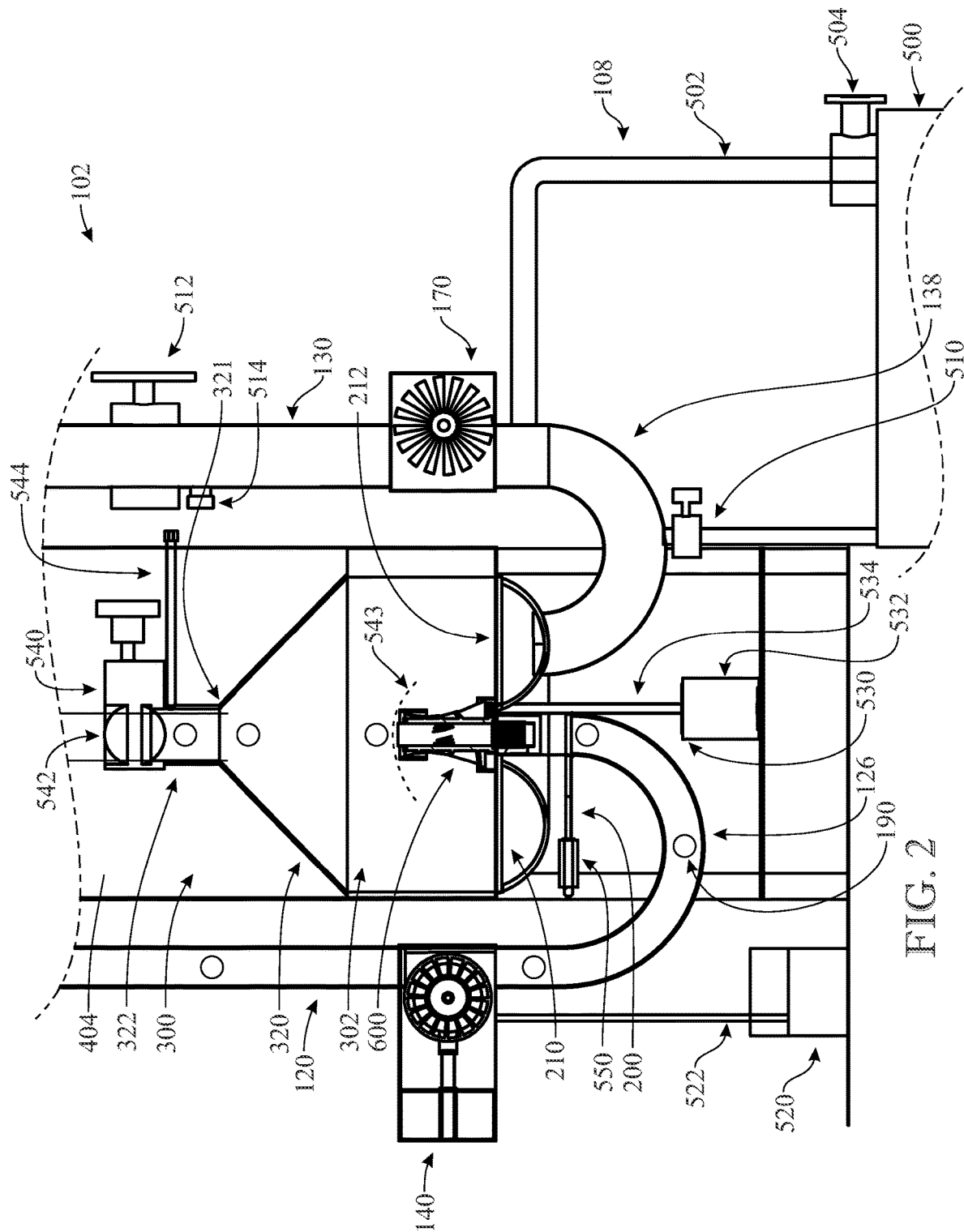
FIG. 2 presents a front elevation, sectional, interior diagrammatic view of the ball-propelling and water-propelling lower stage of the first embodiment of the power generator cell of the present invention.

By way of overview, in operation, the cell 100 functions in the following manner according to one implementation of the present invention. An impeller 600 is housed within a water compartment or chamber 302 located in the input stage 102. The impeller 600 includes a hollow central passageway or tube communicating from a lower inlet end or upstream location to an upper outlet end or downstream location. The chamber 302 forms a receptacle to receive, hold and contain water. The impeller 600, in operation, generates a hydraulic vortex within chamber 302. The input stage 102 includes a first or lower level 200 where a composition of balls 190 and water is mixed and communicated to the inlet end of the impeller tube. In particular, at the inlet end of the impeller tube, the impeller tube receives a flow of spherical objects or balls 190. A supply of water also enters the inlet end of the impeller tube to help replenish and/or maintain the fluid contents of chamber 302. The vortex generated by impeller 600 acts to draw and propel the mixture of balls 190 and water upwards through the central passageway or tube of impeller 600, from its inlet end to its outlet end, where the mixture exits into chamber space 302. The balls 190 subsequently travel and otherwise migrate upwards into and through the fluid contents of intermediate transition stage 106 before reaching the output stage 104. The ascension or upward travel of balls 190, following their exit from the central bore of impeller 600, occurs in response to a combination of influences. First, the balls 190 experience flotation or buoyancy due to their immersion in the fluid of chamber 302 and intermediate stage 106. Second, the balls 190 experience vortex-induced and/or vortex-assisted propulsion, uplift or vertical displacement due to the interaction of balls 190 with the vortex generated by impeller 600. The vortex generated by impeller 600 is sufficient and/or effective to create a pressure differential about the mouth (outlet end) of the central tube of impeller 600; this pressure differential is generally illustrated at 543 (FIG. 2). The pressure differential 543 is sufficient and/or effective to prevent any fluid in chamber 302 from entering the central passageway of impeller 600 at its outlet end, avoiding any backflow of water into the central bore of impeller 600 that would otherwise impede the vortex-induced, upward travel of balls 190 through the central passageway of impeller 600.

The lower level 200 of input stage 102 forms a combination ball-supply and water-supply unit. The impeller 600 is located at a second or mid-level 300 of input stage 102 situated above first level 200 and which forms a combination ball-propelling and water-propelling unit. Above the input stage 102 is intermediate stage 106. In one form, the intermediate transition stage 106 is a contained body of fluid (water) through which the floatable balls 190 ascend to output stage 104. A combination of a natural floating activity and the vortex-assisted propulsion of water may be used to facilitate the upward mobility of balls 190, which ascend to the output stage 104. The vortex generated by impeller 600 is considered to exert and/or effectuate an influence on the balls 190 that urges, supports and otherwise assists balls 190 in their ascending travel through the impeller bore, into chamber space 302, and through intermediate stage 106 to reach upper, output stage 104.

The output stage 104 (FIGS. 5 and 6) is configured, first, to extract the balls 190 and route them into a ball-conveyance dry pipe 120, and, second, to route the water into a water-conveyance wet pipe 130. The balls 190 in dry pipe 120 move under gravity assistance in a substantially airless environment, i.e., vacuum, and travel downstream to a ball-actuated turbine generator 140 (FIG. 7). The turbine generator 140 is mechanically powered by the balls 190, which drive the blade assembly of turbine generator 140 and in turn rotate the shaft of turbine generator 140 in a conventional manner. The turbine generator 140 converts the kinetic energy of the falling or descending balls 190 into the mechanical energy of the driven shaft of turbine generator 140. In a conventional form, an electric generator (not shown) is connected to the driven shaft of turbine generator 140 and converts this mechanical energy into electrical energy. At the other side of output stage 104, the water in wet pipe 130 moves under gravity assistance and travels downstream to a water-actuated turbine generator 170 (FIG. 8). The turbine generator 170 is hydraulically powered by the flowing water, which drives the blade assembly of turbine generator 170 and in turn rotates the shaft of turbine generator 170. The turbine generator 170 converts the kinetic energy of the falling or descending water into the mechanical energy of the driven shaft of turbine generator 170. In a conventional form, an electric generator (not shown) is connected to the driven shaft of turbine generator 170 and converts this mechanical energy into electrical energy. The balls 190 that pass through turbine generator 140 and the water that passes through turbine generator 170 are both routed back to water compartment 302 via a continuation of respective pipes 120, 130, where the cycle starts again.

From an energy perspective, at the input side, the system of cell 100 receives energy in the form of power that drives the water jet impeller 600. The impeller 600 creates a vortex that propels the mixture of balls 190 and water from input stage 102 to output stage 104 (via intermediate stage 106). The input power to drive impeller 600 is transformed into the energy of the vortex, which is then applied to the mixture of balls 190 and water as an upward influence tending to urge the balls 190 to ascend and to direct an upwards flow or displacement of water. As shown, the physical layout of cell 100 has input stage 102 at a lower elevation level and output stage 104 at a higher elevation level. As the vortex-assisted, vortex-influenced, propelled mixture of balls 190 and water ascends/flows upwards from input stage 102 to output stage 104, both the ascending balls 190 and rising water gain potential energy. This potential energy is converted and otherwise transformed into the kinetic energy of the balls 190 flowing downward through dry pipe 120 (under gravity assistance) and the kinetic energy of the water flowing downward through wet pipe 130 (under gravity assistance). On one side, this kinetic energy is used to mechanically drive the ball-actuated turbine generator 140 (via the succession or train of falling balls 190 in pipe 120) and on the other side is used to hydraulically drive the water-actuated turbine generator 170 (via the flowing water in pipe 130). The cell 100 is configured to take advantage of the naturally available force provided by the movement-inducing influence of gravity, which performs the work to change the potential energy of the balls 190 and water (at the upper level output stage 104) into the kinetic energy that drives the ball-actuated turbine generator 140 and the water-actuated turbine generator 170. In another beneficial feature, the vortex created by impeller 600 operates as the central energy source that simultaneously imparts energy to both the ascending balls 190 and the rising water. The cell 100 has a dual energy output, produced by both the ball-actuated turbine generator 140 and the water-actuated turbine generator 170. In effect, cell 100 transforms and multiplies a single source of energy (the power to drive the impeller 600 and in turn create the vortex) into two energy outputs, namely, the power produced by the ball-actuated turbine generator 140 and the water-actuated turbine generator 170.

Additionally, once sufficient water is transported from water supply source 108 to cell 100 (via lower section 138), cell 100 can be operated as a closed system. In such a configuration, the falling balls 190, after mechanically actuating the ball-actuated turbine generator 140, are recycled and recirculated through input stage 102 to participate again in the power generating cycle. Similarly, the falling water, after hydraulically actuating the water-actuated turbine generator 170, is recycled and recirculated through input stage 102 to participate again in the power generating cycle. From the perspective of directional flow regarding the increase in potential energy as balls 190 ascend and the water circulating, the lower-level input stage 302 functions as an upstream location, while the upper-level output stage 104 functions as a downstream location, i.e., the ascending balls 190 and circulating water are communicated from input stage 102 to output stage 104. Alternatively, from the perspective of directional flow involving the transformation of potential energy into kinetic energy to drive turbines 140 and 170 with the falling balls 190 and falling water, respectively, the upper-level output stage 104 functions as an upstream location while the lower-level input stage 102 functions as a downstream location. The vortex formed by the impeller 600 defines a common pathway of travel for the rising water and the ascending balls 190, from the input stage 102 to the output stage 104 via the intermediate stage 106. In particular, the uplifting action produced by the vortex exerts a common influence on the water and balls 190, inducing them to displace upwards in tandem. At the output stage 104, the unified common pathway branches off into two pathways, one directing the balls 190 to the ball-actuated turbine generator 140 (via pipe 120) and another directing the water to the water-actuated turbine generator 170 (via pipe 130).

In the implementation described above, the vortex created by impeller 600 provides an uplift or upwardly-directed propelling, drawing or suctioning action that influences both the balls 190 and the water, creating a line or vector of hydraulic action supporting an upward flow. This line of upward-tending directional displacement facilitated by the vortex also prevents any water in chamber 302 from entering the central passageway of impeller 600 as a backflow. In this first implementation, the vortex acts to drive an upwards current of water from the basin 210 of the input stage 102 past water compartment 302 and through intermediate stage 106 to output stage 104. However, in another second implementation, cell 100 is filled with water prior to operation of the power generation cycle, so that water is continuously available to the output stage 104, making it unnecessary for the vortex to also displace water upwards. In this case, the vortex is needed only to uplift and displace the balls 190. For this second implementation, the lower compartment space 302 housing the water jet impeller 600 is filled with water to form a lower reservoir. The water that fills this lower space 302 is turbulently driven by impeller 600 to form a hydro reaction vortex. Additionally, the upper compartment space 404 is filled with water to form an upper reservoir up to the highest level possible. The lower and upper reservoirs 302, 404 can be filled in advance of the power generating cycle, by discharging sufficient water from water supply source 108, which enters the system of cell 100 through pipe 138.

Figure 3:
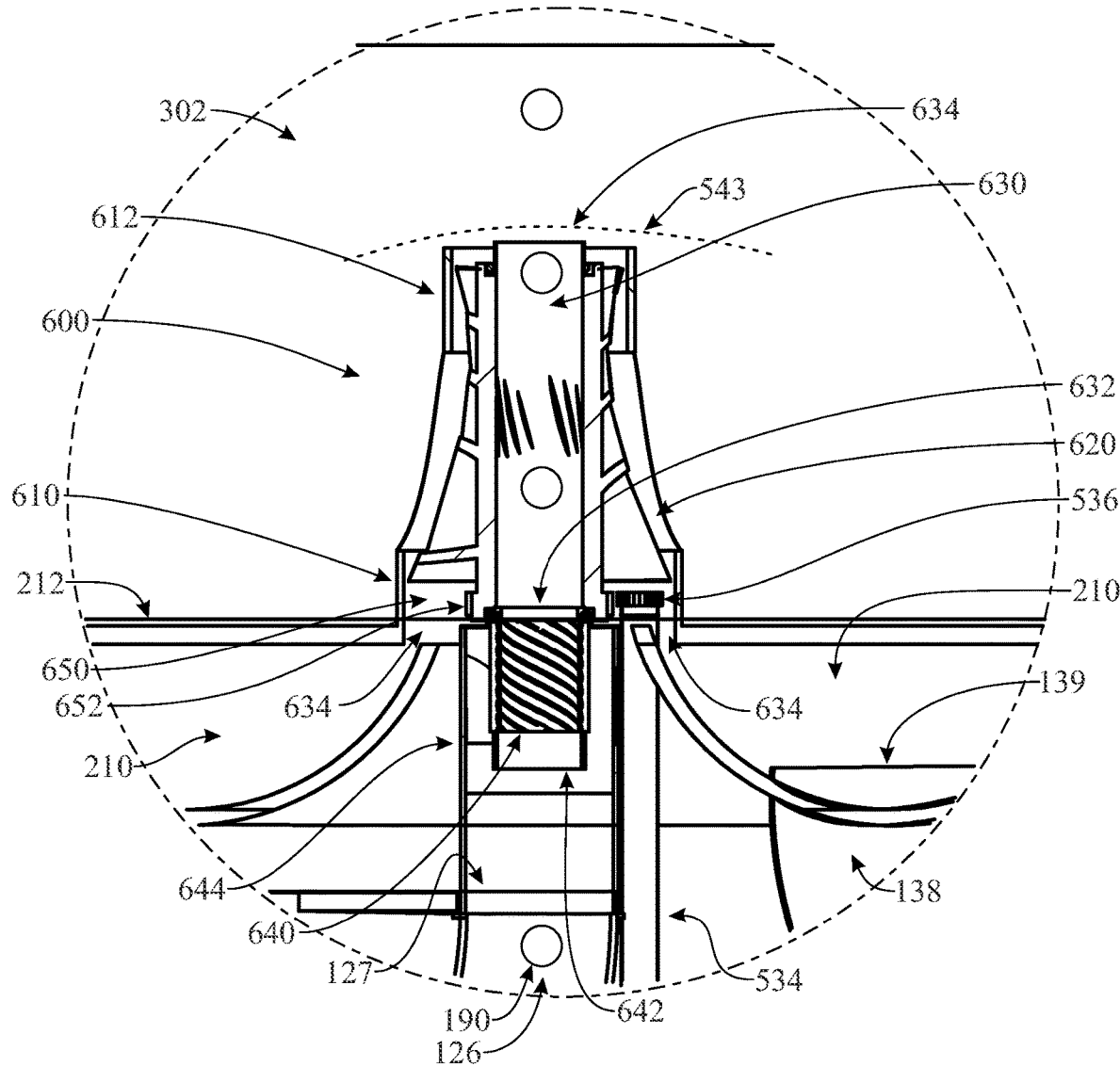
FIG. 3 presents a front elevation, sectional, cut-away view of an impeller unit that forms part of the ball-propelling and water-propelling lower stage of the first embodiment of the power generator cell of the present invention, as originally disclosed in FIG. 1 and further illustrated in FIG. 2.

The power generating cell 100 operates according to a cyclical process that recirculates the elements used to drive the ball-actuated turbine generator 140 (i.e., balls 190) and the water-actuated turbine generator 170 (i.e., water retrieved from upper reservoir 404). In one closed-loop cyclical pathway, the balls 190 track the following route. Initially, at the input stage 102 (lower level 200), the balls 190 are directed into a central vertical passageway 630 of impeller 600. In response to the vortex formed by impeller 600 (based on agitated, turbulent flow in the hydro reactor in lower reservoir 302), the balls 190 are carried upwards and guided through the dry central passageway 630, emerging into the hydro reactor or vortex chamber space 302 (lower reservoir). One will appreciate that the term hydro reactor and vortex chamber are used interchangeably throughout the detailed description. Referring to FIGS. 2-3, the balls 190 then migrate upwards into intermediate stage 106 (upper reservoir 404), ascending until they reach the upper stage 104. Here, the balls 190 are extracted from upper reservoir 404 and routed through left-hand pipe 120 on a descending path to the ball-actuated turbine generator 140, where the descending balls 190 drive turbine generator 140. After executing their driving action of the mechanically-driven turbine generator 140, the still-descending balls 190 continue onwards through pipe 120, enter input stage 120 (lower level 200), namely the mouth entrance 642 of the impeller 600, and redirected to the central passageway of impeller 600, completing the cycle and initiating another one. On another closed-loop cyclical pathway, water in the upper reservoir 404 is routed through right-hand pipe 130 on a descending path to the water-actuated turbine generator 170, where the descending water drives turbine generator 170. After executing its driving action of the hydraulically-driven turbine generator 170, the still-descending water continues onwards through pipe 130, of input stage 120 (lower level 200), re-enters the water system (i.e., via lower reservoir 302), and is once again available to participate in another cycle. In various forms, the movement of balls 190 through the central bore 630 of impeller 600, in response to the action of the vortex that is formed, created and otherwise generated by impeller 600, can be considered a translation, displacement, and/or communication of balls 190 under the assistance of the vortex.

Figure 4:
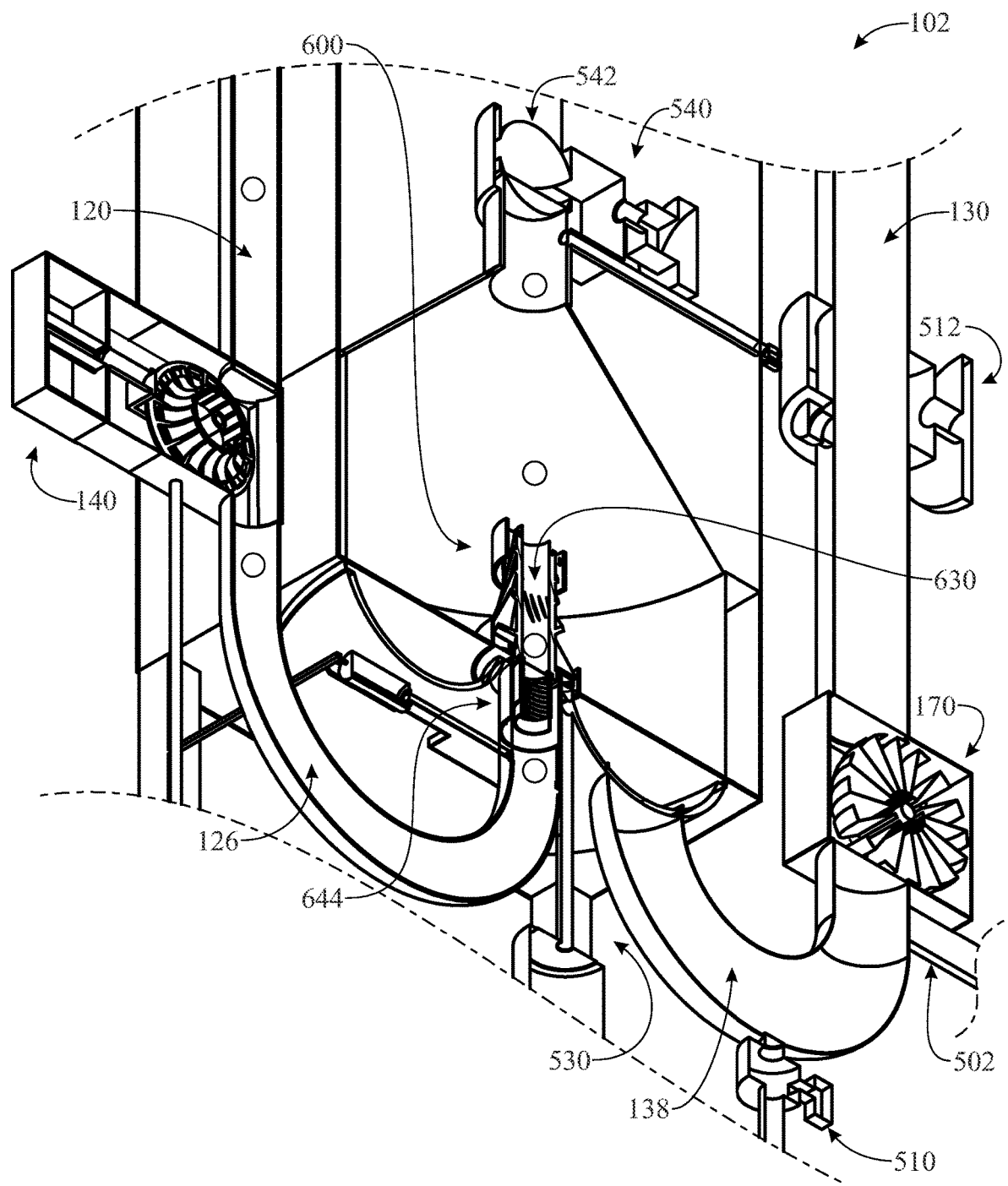
FIG. 4 presents a front perspective, sectional, cut-away view of the ball-propelling and water-propelling lower stage of the first embodiment of the power generator cell of the present invention, as originally disclosed in FIG. 1 and further illustrated in FIG. 2.

Referring now to FIGS. 2 and 4, more detail is now provided for input stage 102 located at the lower level of cell 100. Reference is also made to FIG. 3 for further detail of water jet impeller 600 and the surrounding structure. The outlet mouth 127 of left-side dry pipe 120 (which conveys descending balls 190) and the outlet mouth 139 of right-side wet pipe 130 (which conveys falling water) are fed into the bottom side of a donut-shaped basin 210, which forms part of the water-supply subunit 200. Briefly, as discussed further, the impeller 600 includes a body having the form of a rotary hub or carrier that carries a peripheral blade assembly 620 disposed at the exterior of the hub. The hub has a hollow central passageway, tubular structure or bore 630 communicating from a lower input end to an upper output end. The central bore 630 defines an axis of rotation of blade assembly 620. In one form, the impeller 600 is configured in the form of an axial-type impeller design since the directional flow developed by the action of the vortex formed by operation of impeller 600 is along the rotational axis.

The outlet mouth 127 of dry pipe 120 is aligned with the central passageway 630 of impeller 600 (and the central hole or aperture of donut-shaped basin 210), allowing balls from dry pipe 120 to communicate and otherwise be transferred into the central passageway 630. A floor 212 overlies and encloses basin 210 at its top or upper side. The outlet mouth 139 of wet pipe 130 communicates directly into the interior space of donut-shaped basin 210, allowing water from pipe 130 to convey into basin 210 and eventually into lower reservoir 302 via a passageway 634 provided by impeller 600 (FIG. 3). The donut-shaped basin 210 effectively functions as a feed unit for directing water (returning or flowing through pipe 130 via turbine generator 170) and balls 190 (returning through pipe 120 via turbine generator 140) into the lower reservoir 302 via the water jet impeller 600. The central passageway 630 of impeller 600 effectively functions as a guide structure that helps guide and transfer balls 190 from below (via the ball-conveyance dry pipe 120) to the lower reservoir 302, which move in response to the impelling action of the vortex generated and otherwise developed by impeller 600.

Figure 9:
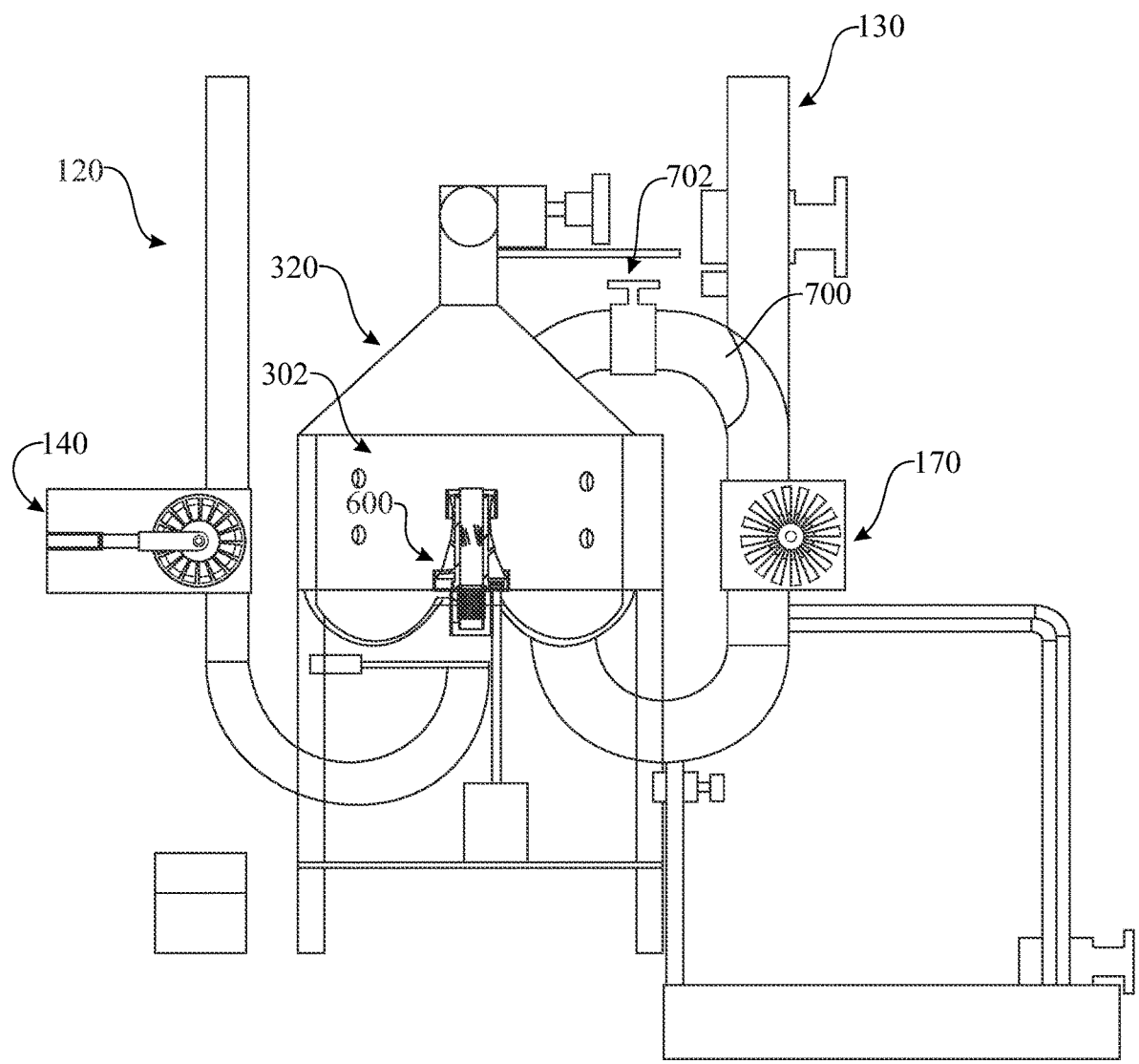
FIG. 9 presents a front elevation, interior diagrammatic view of the ball-propelling and water-propelling lower stage according to one aspect of the first embodiment of the power generator cell of the present invention, illustrating one modification involving the addition of a return pipe from the top of the cone-shaped divider in the reactor chamber.

Various alternate arrangements can be deployed to facilitate the deposit and flow of water into lower reservoir 302. In one form, water from wet pipe 130 and return pipe 700, following its traversal of water-actuated turbine 170, continues downstream through pipe 130 and flows into basin 210 (FIG. 9). From there, a passageway 634 provided in impeller 600 provides a path to communicate water from basin 210 to lower reservoir 302. In this configuration, the balls 190 descending through pipe 120 (and actuating turbine 140) are directed to enter the central bore 630 in impeller 600, where the action of the vortex created by impeller 600 acts to draw the balls 190 through impeller bore 630 and into lower reservoir 302. In this arrangement, the balls 190 preferably traverse impeller bore 630 with little or no mixture or contact with water. Instead, a separate, independent path is provided to enable balls 190 and the turbine-driving water to each enter lower reservoir 302 by their own distinct pathway.

The impeller 600 sits on floor 212 and is disposed within a vortex chamber or lower reservoir water compartment 302. The upper part of lower reservoir 302 is defined by an inverted funnel or cone-shaped divider 320 having a frusto-conical configuration, where the larger-diameter inlet mouth faces the impeller 600. At the smaller-diameter outlet mouth of cone-shaped divider 320, a transition tube 322 is located that communicates the lower reservoir 302 to the upper reservoir 404 via an adjustable water retention valve 540, which controls and otherwise regulates flow from the lower reservoir 302 to the upper reservoir 404. The valve 540 includes a valve outlet 542 that communicates directly into upper reservoir 404. The neck of transition tube 322 is fitted with an air intake valve assembly 544 that operates as a check valve to draw air out of the system, which can be useful when the water needs to be drained out of the system for maintenance purposes. The cone-shaped divider 320 helps concentrate the water as it circulates upwards under the combined action of the vortex created by impeller 600. The inverted cone-shaped divider 320 performs a funneling operation, which, in cooperation with the vortex generated by impeller 600, facilitates passage of the balls 190 from the lower reservoir 302 to the upper reservoir 404 via the transition tube 322. The lower reservoir 302 and upper reservoir 404 are otherwise fluidly isolated from one another except for their fluid connection via cone-shaped divider 320.

Referring now to FIG. 8, with continuing reference to FIGS. 1-4, a water-actuated, hydraulically-driven turbine generator 170 is disposed along the length of wet pipe 130, according to the present invention. The turbine generator 170 has a conventional form. The turbine generator 170 includes a housing 180 that houses a turbine unit 172 having an array of rotatable turbine blades 174 and a turbine central shaft 176 that moves in tandem with the blade array 174. The turbine blade array 174 is suitably configured to be hydraulically driven in response to water impinging on or driving the blades. The turbine generator 170 is suitably positioned relative to pipe 130 to permit descending water flowing through pipe 130 to impinge and otherwise be directed against the blade array 174 so that the blade array 174 will rotate, which communicates its rotation to turbine shaft 176. An electrical generator (not shown) is coupled to turbine generator 170, so that the mechanical energy of the rotating turbine shaft 176 can be converted into electrical energy. At an inlet or upstream side of turbine generator 170, the pipe 130 has an ingress or inlet opening 132 that allows descending water to flow onto blade array 174 and drive its rotation. At an outlet or downstream side of turbine generator 170, the pipe 130 has an egress or outlet opening 134 that allows the water powering turbine generator 170 to continue on its passageway through a lower U-shaped section 138 of pipe 130, where it eventually rejoins the main water body via the donut-shaped basin 210. As shown in FIG. 3, the lower U-shaped section 138 of pipe 130 terminates in an outlet mouth 139 communicating with the interior space of donut-shaped basin 210.

The wet pipe 130 may be fitted with a water valve assembly 512, at an upstream location relative to turbine generator 170. The valve assembly 512 can regulate the water flow through wet pipe 130. A check valve 514 is also provided to regulate the flow of air into wet pipe 130. The cell 100 is connected to a water reserve storage tank generally illustrated at 500, which as part of water supply source 108 supplies water to cell 100 via a water supply pipe 502 that connects to wet pipe 130 at a downstream location relative to turbine generator 170. The storage tank 500 may be equipped with a conventional valve assembly 504 to regulate the flow of water from storage tank 500. The wet pipe 130, at its lower U-shaped section 138, may be equipped with a drain valve 510 configured to regulate the flow of water out of cell 100 via drain valve 510, if drainage is desired.

Referring now to FIG. 7, with continuing reference to FIGS. 1-4, a ball-actuated, mechanically-driven turbine generator 140 is disposed at the left side of cell 100, along the length of dry pipe 120. The turbine generator 140 has a conventional form. The turbine generator 140 includes a cage or housing 150 that houses a turbine unit 142 having an array of rotatable turbine blades 144 and a turbine central shaft 146 that moves in tandem with the blade array 144. The turbine blade array 144 is suitably configured to be mechanically driven in response to the interaction or activity of descending balls 190 impinging on or driving the blades. The turbine generator 140 is suitably positioned relative to pipe 120 to permit descending balls 190 (conveying through pipe 120) to impinge and otherwise be directed against the blade array 144 so that the blade array 144 will rotate, which communicates its rotation to turbine shaft 146. An electrical generator (not shown) is coupled to turbine generator 140, so that the mechanical energy of the rotating turbine shaft 146 can be converted into electrical energy. At an inlet or upstream side of turbine generator 140, the pipe 120 has an ingress or inlet opening 122 that allows descending balls 190 to fall onto blade array 144 and drive its rotation. At an outlet or downstream side of turbine generator 140, the pipe 120 has an egress or outlet opening 124 that allows the balls 190 powering turbine generator 140 to continue on their passageway through a lower U-shaped section 126 of pipe 120, where they are recirculated back to lower reservoir 302 via impeller 600. As shown in FIG. 3, the lower U-shaped section 126 of dry pipe 120 terminates in an outlet mouth 127 communicating with impeller 600 (at the inlet end of its central passageway 630) via the central aperture of donut-shaped basin 210.

In a preferred form, the ball-actuated turbine generator 140 is equipped with a hydraulic arm generally illustrated at 160 to effect a controllable translation of turbine unit 142. This feature is added for the purpose of optimizing the location of turbine unit 142 relative to pipe 120 to create the most advantageous driving action of descending balls 190 on turbine blade array 144 and thereby control the power generation available from turbine generator 140. The hydraulic arm 160 is yoked to the turbine unit 142 using a U-shaped yoke or frame 164 that attaches at its arms to opposite sides of turbine shaft 146. A control unit 162 controls the operation of hydraulic arm 160. The housing 150 may be divided by a partition 156 into a turbine compartment 152 (housing turbine unit 142) and a control unit housing compartment (housing control unit 162). The power source for control unit 162 may use pressurized air available from an air compressor 520 having an air input suction pipe connected to control unit 162 (FIG. 2). The air compressor 520 depressurizes dry pipe 120 and maintains the pressure within the pipe at a predetermined pressure. The depressurization of the pipe provides an airless environment that allows the balls 190 to fall within the pipe 120 under gravity with little to no air resistance. The lack of air resistance maximizes the rate of speed in which the balls fall under the effects of gravity, maximizing the system throughput and rate of power generation. A guillotine valve 550 may be optionally installed with dry pipe 120 (FIG. 2). The guillotine valve 550 automatically opens or closes to prevent water in chamber 302 from entering into dry pipe 120.

Reference is now made to FIG. 3, with continuing reference to FIGS. 1, 2 and 4, for a description of the vortex-generating, water jet impeller 600. The impeller 600 includes a central, generally upright tubular body 630 defining a passageway that is open at both inlet and outlet ends 632, 634, respectively. A blade assembly generally illustrated at 620 is disposed about the tubular body 630 and mounted in a carousel-type manner on a generally planar, rotatable driven gear 650 having a peripheral gear feature 652 disposed about its circumference. The impeller 600 can incorporate any suitable housing structure, such as a lower housing section 610 or base carrying driven gear 650 and an upper housing section 612. The blade assembly 620 of impeller 600 is configured so that during operation, as blade assembly 620 rotates, a vortex is generated by the turbulent water flow created by the interaction of blade assembly 620 with the surrounding water in lower reservoir 302, in the vicinity of the space above the mouth (outlet end 634) of impeller 600. The turbine 600 creates a hydro reaction with the water inside lower reservoir 302 that is sufficient and/or effective to create a reverse pressure differential generally illustrated at 543, in the near neighborhood of the mouth or outlet end 634 of impeller central bore 630. This reverse pressure differential effectively functions as a barrier to prevent water from entering the impeller passageway 630 via outlet end 634, which helps maintain a dry atmosphere for dry pipe 120 since water from lower reservoir 302 is impeded from being able to backflow through impeller passageway 630 (from outlet end 634 to inlet end 632) and reach pipe 120.

The impeller 600 is located so that the passageway defined by tubular body 630 is axially aligned with the central aperture formed in the donut-shaped basin 210, which itself is aligned with the terminal mouth 127 of lower section 126 of ball-conveying dry pipe 120. The balls 190, after descending through the ball-actuated turbine generator 140, continue their travel in pipe 120 until they reach mouth 127, where they are then transferred and otherwise directed into the central passageway 630 of impeller 600. In order to facilitate this transfer, a spiral screw passageway or barrel passageway 640 is disposed intermediate the inlet mouth 632 of impeller passageway 630 and outlet mouth 127 of pipe 120. The barrel passageway 640 is threaded at its interior surface with a spiral threaded pattern that helps grip and securely hold balls 190 that enter into passageway 640 through the water-feed and ball-feed entrance mouth 642, which is axially adjacent the terminal outlet mouth 127 of dry pipe 120. The barrel passageway 640 may be encased in a housing 644. Although a space is shown between mouth 642 and mouth 127, this is merely for illustrative purposes as any suitable spacing may be used to ensure the transfer of balls 190 from pipe 120 to central axial passageway 630 of impeller 600. In one form, the spiral screw barrel passageway 640 is a rotary device driven by any conventional means known to those skilled in the art to effectuate the upward translation of a ball 190 through the passageway 640.

During operation, the blade assembly 620 of impeller 600 is driven to rotate. Any suitable means may be used to drive the rotation of blade assembly 620. In one implementation, the driving or powering action applied to impeller 600 is facilitated by a drive assembly generally illustrated at 530 (FIG. 2). The drive assembly 530 includes, in combination, an electric motor 532, a motor-driven rotary shaft 534 actuated by electrical motor 532, and a drive gear 536 disposed at the end of shaft 534 (FIG. 3), which inter-meshes with the peripheral gear feature 652 of the blade-mounted carousel gear 650. The operation of mechanical drive assembly 530 drives the rotation of blade assembly 620 via the geared engagement between drive gear 536 and driven gear 650, 652. The construction and operation of blade assembly 620 are configured in a manner calculated to create a vortex within lower reservoir 302.

As the turbine blade assembly 620 rotates, it sucks or draws water from basin 210 through passageways 631 (which flows into lower reservoir 302) and sufficiently agitates the water present within lower reservoir 302 to create a turbulent flow that generates a hydraulic vortex within lower reservoir 302. The impeller 600 generates an uplift action in the water that is exerted on objects caught within the vortex core, which is sufficient and/or effective to induce any objects (i.e., balls 190) present within the vortex core to experience an uplift or displacement in the vertical direction along the vortex line. In FIG. 3, balls 190 present themselves at the terminal outlet mouth 127 of dry pipe 120, and with the momentum carried via the fall in pipe 120, the balls 190 enter the passageway 630 of the impeller 600. In response to the momentum, balls 190 are induced and otherwise urged to move upwards into barrel passageway 640 (via the ball-feed entrance mouth 642), where they continue their upwards travel through central passageway 630 of impeller 600 (from inlet end 632 to outlet end 634) and eventually emerge through outlet end 634 into lower reservoir 302. The floatable balls 190 have sufficient propulsion, induced in-part by the vortex influence, to continue moving through the cone-shaped divider 320 (FIG. 2) and into the upper reservoir 404, where the balls 190 continue their upwards movement through the water body of intermediate stage 106 to the upper-level, output stage 104.

Figure 5:
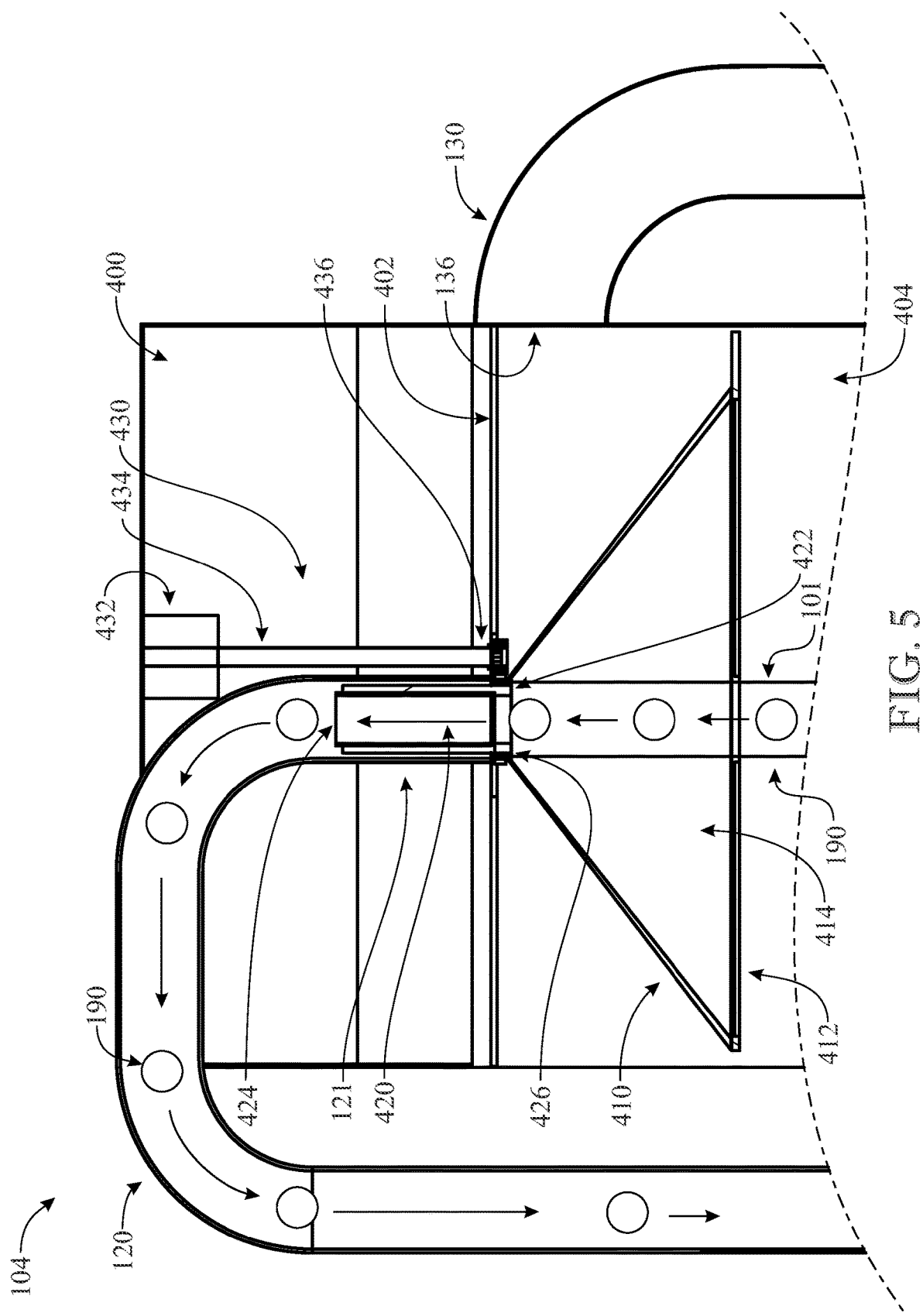
FIG. 5 presents a front elevation, sectional, interior diagrammatic view of the ball-recirculating and water-recirculating upper stage of the first embodiment of the power generator cell of the present invention.
Figure 6:
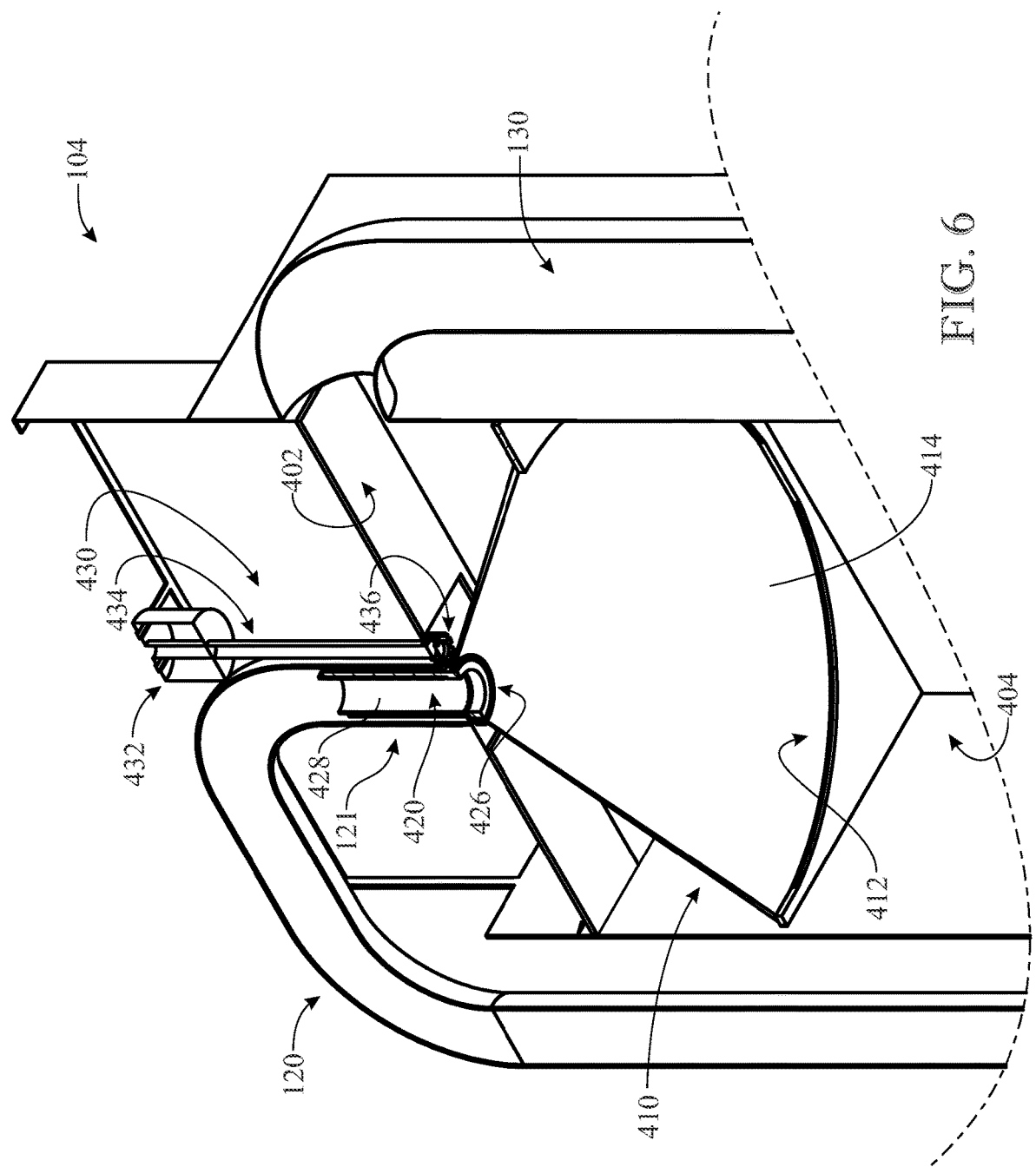
FIG. 6 presents a front perspective, sectional, cut-away view of the ball-recirculating and water-recirculating upper stage of the first embodiment of the power generator cell of the present invention, as originally disclosed in FIG. 1 and further illustrated in FIG. 5.

Referring now to FIGS. 5 and 6, with continuing reference to FIG. 1, more detail is now provided for output stage 104 located at the upper level of cell 100. The output stage 104 includes a ball and water-recirculating subunit 400 that is configured to direct water from upper reservoir 404 into the water-conveyance wet pipe 130 (where it routes to water-actuated turbine generator 170) and to direct balls 190 ascending through upper reservoir 404 (under a buoyant floating motion) into the ball-conveyance dry pipe 120 (where they route to ball-actuated turbine generator 140). The building 110 preferably includes a roof 402 that defines the upper water level within upper reservoir 404. Water from upper reservoir 404 is directed (at the right-hand side of the figures) into the water-conveyance wet pipe 130 via inlet mouth 136, where it flows downstream to power the water-actuated, hydraulically-driven turbine generator 170.

In order to aid in the transportation of the balls 190 ascending from the input state 102 to the output stage 104, the cell 100 includes a rail 101 (FIG. 1). At a lower end portion, the rail 100 is connected to the valve outlet 542 of the ball-propelling subunit 300. The rail extends vertically and connects at an upper portion of the inlet 422 of the extraction device 420 (FIG. 5). The rail 101 provides a conduit that guides the path of ascending balls 190 in an upward trajectory. The extraction device 420 is configured as a rotatable hollow screw nut having a spiral threaded feature 722 (FIG. 13) disposed at the inner surface of its hollow interior 428. Balls 190 that ascend fully through funnel 410 enter the extraction device 420 at its screw nut inlet 422. The threaded feature at the hollow interior 428 of extraction device 420 functions to grab and secure the balls 190 in hollow interior 428. As the screw nut 420 rotates, the captured balls 190 are gradually displaced, carried and otherwise transferred vertically upwards through the hollow interior 428 of screw nut 420 until the balls 190 emerge from the screw nut outlet 424 into pipe 120. Any suitable means may be used to drive the rotation of screw nut 420. For example, in one implementation, the driving or powering action is facilitated by a drive assembly or nut-driving apparatus generally illustrated at 430 that includes, in combination, an electric motor 432, a motor-driven rotary shaft 434 actuated by electrical motor 432, and a drive gear 436 disposed at the end of shaft 434 that inter-meshes with the peripheral gear feature of a driven rotary gear 426 mounted to screw nut 420. The operation of drive assembly 430 drives the rotation of screw nut 420 via the geared engagement between drive gear 436 and driven gear 426.

The balls 190 follow a circular pathway through cell 100. After emerging from the central bore 630 of impeller 600 under the influence of the impeller-generated vortex, the ascending balls 190 travel successively to chamber 302 and then upper reservoir 404, where balls 190 are returned to impeller 600 via the combination of pipe 120 and turbine generator 140 to begin the cycle again. In particular, following their ascension to upper reservoir 404, the balls 190 are recirculated and transferred again to drive the ball-actuated turbine generator 140 located downstream of output stage 104.

Figure 10:
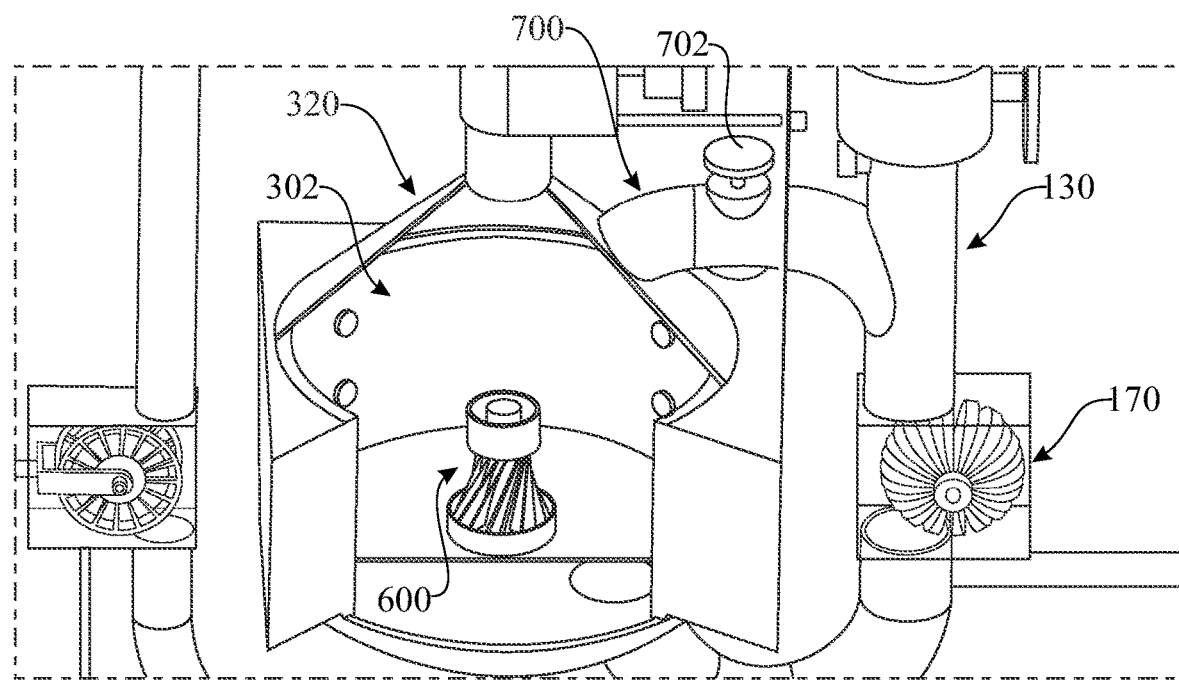
FIG. 10 presents a front perspective, sectional, cut-away view of the lower stage illustrating the impeller unit housed in the reactor chamber and further illustrating the arrangement of the return pipe originally disclosed in FIG. 9.
Figure 11:
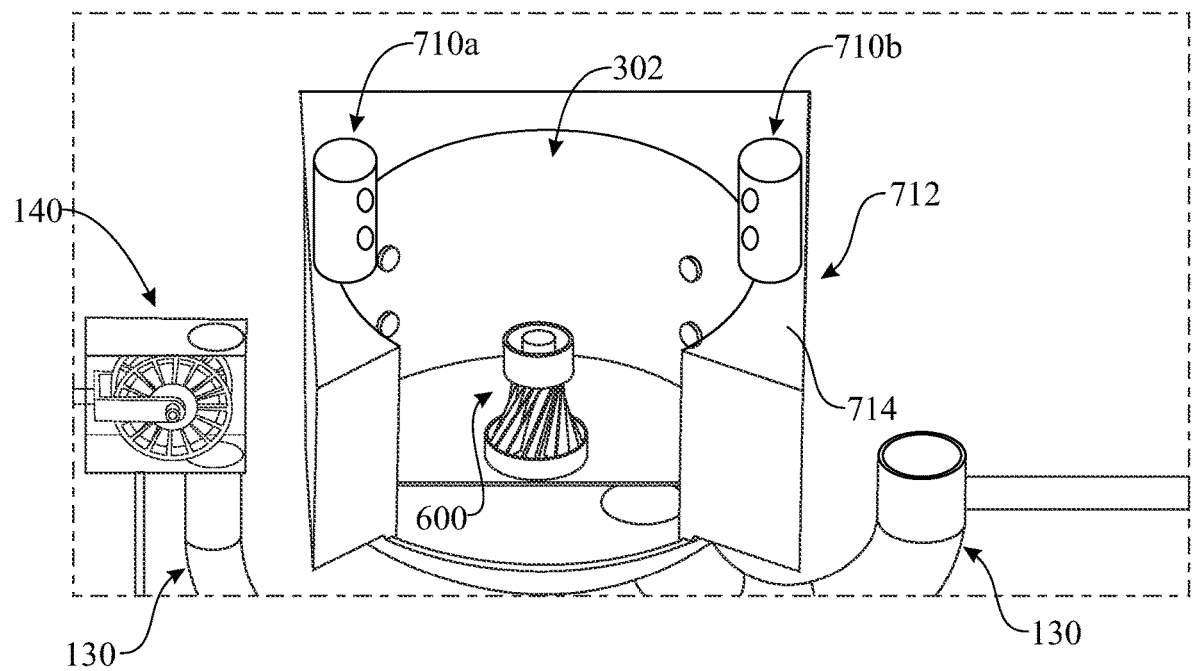
FIG. 11 presents a front perspective, sectional, cut-away view of the lower stage, with the removal of the cone-shaped divider for clarity of view, according to another aspect of the first embodiment of the power generator cell of the present invention, illustrating an additional modification involving an arrangement of water pressure tanks disposed on the body of the reactor chamber walls.
Figure 12:
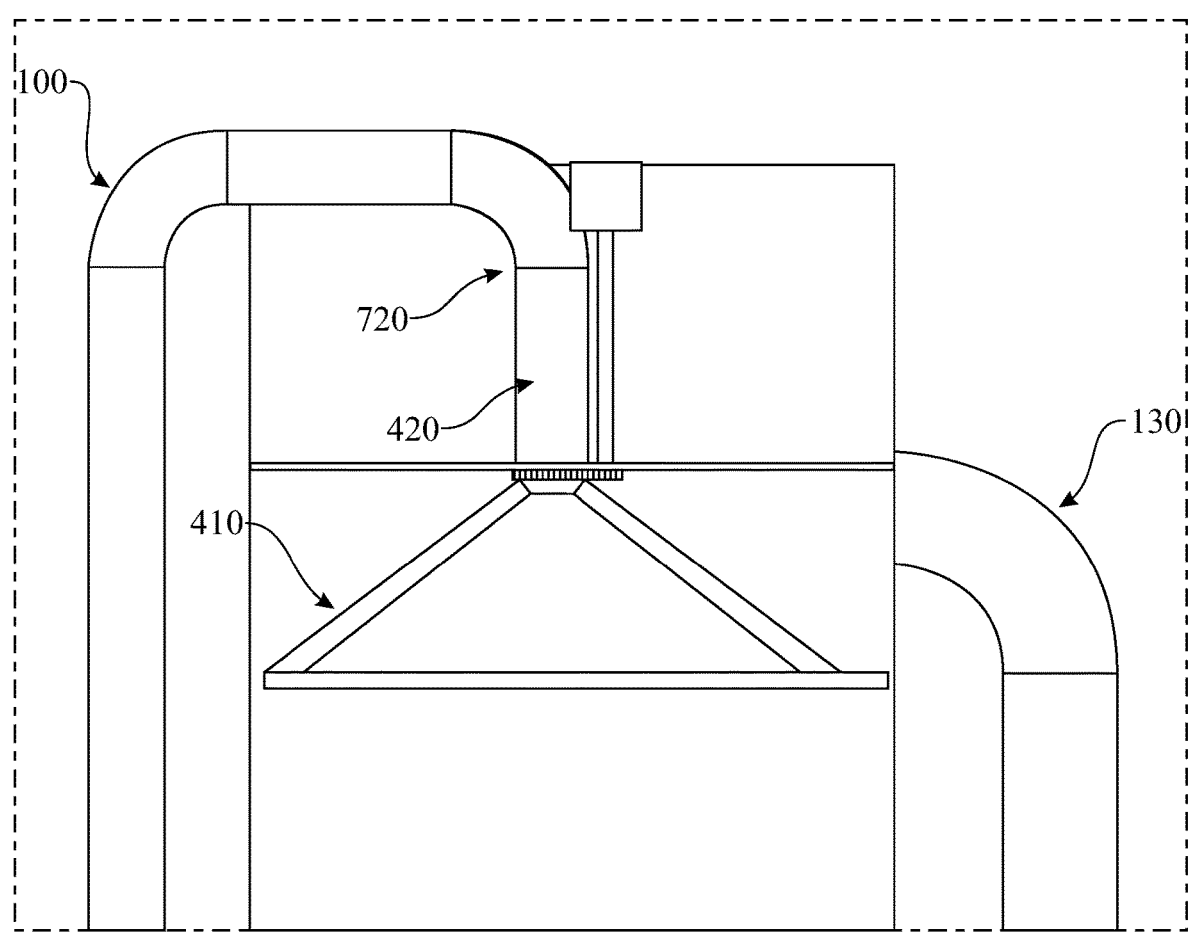
FIG. 12 presents a front elevation view of the ball-recirculating and water-recirculating upper stage of the first embodiment of the power generator cell of the present invention, illustrating the location and installation of a sealing element above the ball extractor screw nut.
Figure 13:
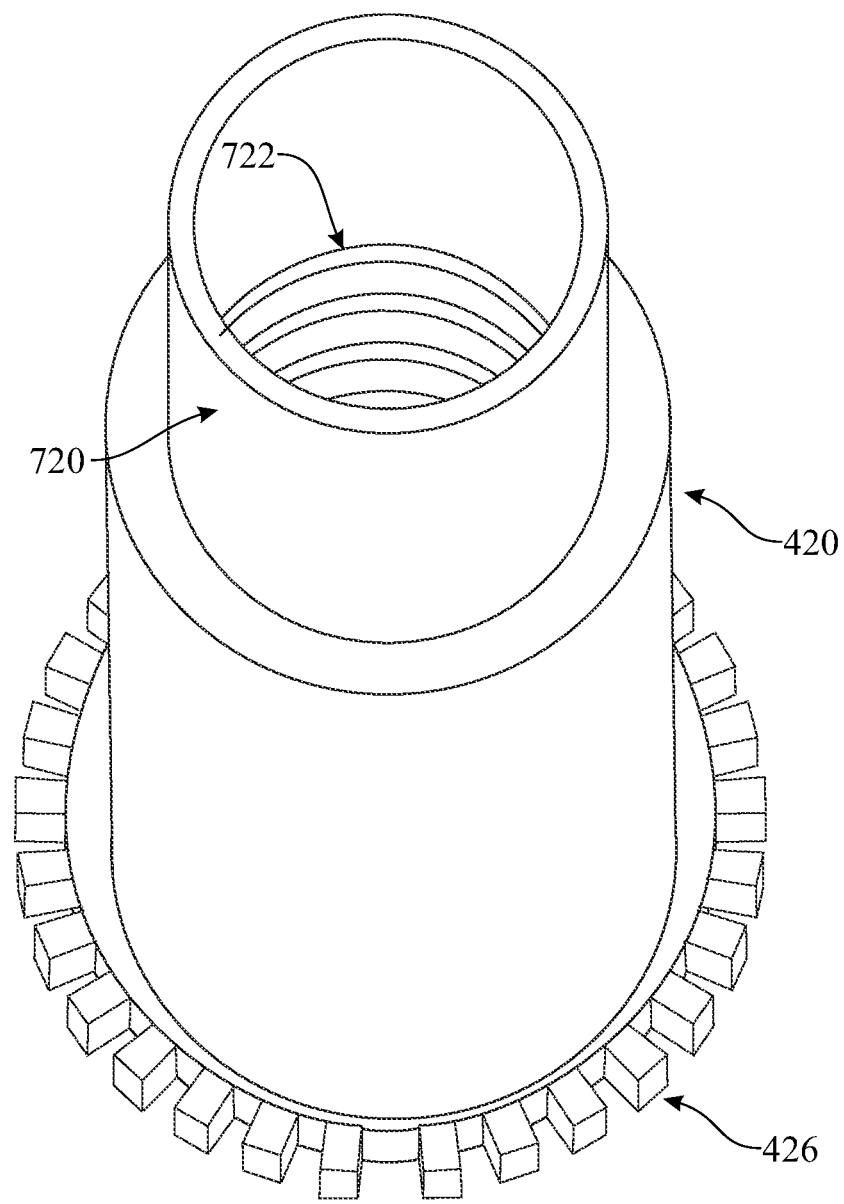
FIG. 13 presents an upper perspective view of the ball extractor screw nut assembly located in the upper stage of the first embodiment of the power generator cell of the present invention.
Figure 14:
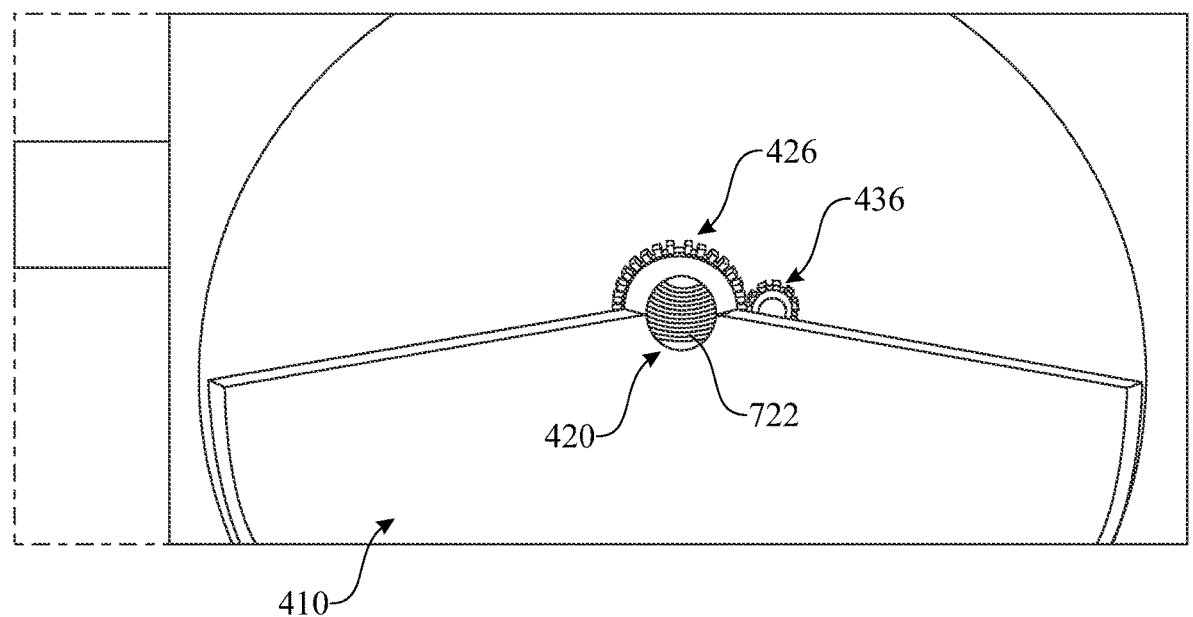
FIG. 14 presents a bottom perspective view of the upper stage according to the first embodiment of the power generator cell of the present invention, illustrating in a cut-away view the drive gear mechanism configured at the outlet of the ball funnel to drive the ball extractor screw nut.

Cell 100 may be equipped with various additional features and modifications. Referring now to FIGS. 9 and 10, a modification is disclosed according to one aspect of the present invention. A return pipe generally illustrated at 700 is installed between the inverted, cone-shaped divider 320 and wet pipe 130, preferably at a location upstream of the water-actuated turbine 170. The return pipe 700 establishes a fluid path between the chamber 302 housing impeller 600 and pipe 130. In one form, the return pipe 700 is disposed near the upper end of divider 320 proximate its outlet. The direction of water flow through return pipe 700 is from chamber 302 to pipe 130. The return pipe 700 assists in the movement of water at higher speeds and facilitates better control of the flow of water. An electronic valve 702 is optionally provided in return pipe 700 to help manage the flow of water through return pipe 700. Referring to FIG. 11, an additional modification is disclosed according to another aspect of the present invention. For viewing purposes only, certain features disclosed in other figures have been removed from the diagram depicted in FIG. 11, including a section of pipe 120 above the ball-actuated turbine 140, a section of pipe 130, the water-actuated turbine 170, and divider 320. A set of interior water pressure tanks 710a,b are added to the body 714 of the reactor chamber housing 712 that houses impeller 600 and defines chamber space 302. The pressure tanks 710a,b are configured to control the water pressure that develops inside chamber 302 during operation of impeller 600, particularly in regard to the water pressure attending the formation and ongoing presence of the vortex. Any number of pressure tanks can be installed; for example, in one form, a water pressure tank is installed at each of the four corners of housing 712. Referring now to FIGS. 12-14, a further modification is disclosed according to yet another aspect of the present invention. A liner seal generally illustrated at 720 is located within the hollow interior of the ball-extractor screw nut 420, which as discussed earlier facilitates the transfer of the ascending balls 190 from the upper reservoir 404 (and chute 410) to dry pipe 120 (and eventually to the ball-actuated turbine 140). The liner seal 720 is configured in the form of a cylindrical sleeve that includes at least one portion extending above the upper terminus of the spiral threaded feature 722 formed at the inner surface of ball-extractor screw nut 420. The liner seal 720 may have a lower portion radially adjacent the spiral threaded feature 722 and partially coextensive therewith, in which case the liner seal 720 would be positioned radially outward of the spiral threaded feature 722. During operation, as the balls 190 complete their vertical displacement and/or translation through the ball-extractor screw nut 420 via the rotary action of the spiral threaded feature 722, the balls 190 will encounter the liner 720 in an intimate, seal-tight engagement in which a press-fit, pressure seal forms between the ball 190 and liner 720. Residual water on balls 190 will act as lubricant to help the balls traverse liner seal 720 yet maintain the pressure seal engagement. The liner seal 720 functions in part to prevent air from entering the water tank. When cell 100 is offline or not operational, any balls 190 still in transit through screw nut 420 and captured by liner seal 720 and/or spiral threaded feature 722 of nut 420 will remain in place to secure the seal until the system turns on again, at which point any balls 190 in transit will resume their trajectory to the ball-actuated turbine 140 via dry pipe 120.

Cell 100 may include various optional features. The water valves are preferably electrical devices, controlled and monitored by a main control center. Various sensors may be installed throughout the entire system, such as water temperature sensors, water speed sensors, torque sensors, water flow sensors, water directional sensors, water quality sensors, ball location sensors, electric current sensors, motor speed sensors, motor temperature sensors, moisture sensors, vibration sensors, and stress sensors. Additionally, monitoring cameras may be incorporated at various locations of cell 100. In one form, cell 100 may be configured as a fully automated system, running and operating under the supervision of artificial intelligence technology, for example.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A power generator system, comprising:
a water receptacle arrangement defining a water environment, the water receptacle arrangement including an upper end, a lower end, a water-fillable enclosure defining an upper reservoir space, and a hydro chamber defining a lower reservoir space;

an impeller housed in the chamber of the water receptacle arrangement, the impeller having a bore extending between an inlet end to an outlet end thereof, the impeller outlet end disposed in fluid communication with the lower reservoir space;

a water-conveyance arrangement configured at least in part to define a fluid-communicating pathway between the upper end and the lower end of the water receptacle arrangement;

a water-driven first turbine configured to be operably driven by water traversing the water-conveyance arrangement;

at least one ball;

a ball-conveyance arrangement configured at least in part to define a ball-communicating pathway between the upper end of the water receptacle arrangement and the inlet end of the impeller bore; and a ball-driven second turbine configured to be operably driven by any of the at least one ball traversing the ball-conveyance arrangement;

the impeller configured to operably generate a vortex, wherein the vortex generated by the impeller is sufficient to assist at least one ball ingressing the impeller to communicate through the impeller bore from the inlet end to the outlet end thereof and to assist at least one ball egressing the impeller to communicate from the impeller outlet end to the upper end of the water receptacle arrangement via the lower reservoir space and the upper reservoir space.

2. The system as recited in claim 1, wherein the vortex generated by the impeller is sufficient to hinder the communication of water from the lower reservoir space into the impeller bore via the impeller outlet end.

3. The system as recited in claim 1, wherein the vortex generated by the impeller is sufficient to assist in the formation of hydraulic flow activity communicating through the water environment from the lower end to the upper end of the water receptacle arrangement.

4. The system as recited in claim 1, wherein:
the ball-communicating pathway defined by the ball-conveyance arrangement includes a ball delivery section disposed at a higher elevation relative to the ball-driven second turbine; and
the fluid-communicating pathway defined by the water-conveyance arrangement includes a water delivery section disposed at a higher elevation relative to the water-driven first turbine.

5. The system as recited in claim 1, wherein the ball-conveyance arrangement further includes:
a pipe extending between an inlet end and an outlet end thereof, the pipe inlet end and the pipe outlet end respectively disposed in fluid communication with the water receptacle arrangement at the upper end and the lower end thereof;
a first ball capture mechanism disposed at least in part within the inlet end of the pipe, the first ball capture mechanism configured to receive any one of the at least one ball ascendant to the upper reservoir space of the water receptacle arrangement and to communicate the reservoir-received ball into the pipe; and
a second ball capture mechanism disposed proximate the outlet end of the pipe, the second ball capture mechanism configured to receive any one of the at least one ball traversing the pipe and to communicate the pipe-traversing ball into the impeller bore via the impeller inlet end.

6. The system as recited in claim 5, wherein:
the first ball capture mechanism includes a hollow rotary screw device; and
the second ball capture mechanism includes a hollow rotary screw device.

7. The system as recited in claim 5, further includes:
a divider configured to define a transition between the lower reservoir space and the upper reservoir space; and
a ball-guiding arrangement configured to facilitate the transfer of a ball from the upper reservoir space to the ball-conveyance pipe at the inlet end thereof.

8. The system as recited in claim 7, wherein:
the divider includes an inverted cone-shaped funnel structure; and
the ball-guiding arrangement includes an inverted cone-shaped funnel structure.

9. A method of generating power, comprising the steps of:
providing an impeller within a water environment having an upper end and a lower end, the impeller having a bore extending between an inlet end and an outlet end thereof;
providing at least one ball;
directing the at least one ball to the impeller bore;
causing the impeller to generate a vortex sufficient to assist any ball ingressing the impeller to communicate through the impeller bore from the inlet end to the outlet end thereof and to egress into the water environment;
defining a ball recirculation path facilitating the transfer of a ball, experiencing a gain in elevation through the water environment in response to at least one of buoyancy and the influence of the vortex generated by the impeller, to the impeller at the inlet end thereof;
causing a ball traversing the ball recirculation path to drive a ball-actuatable turbine;
defining a water recirculation path facilitating the transfer of water from the upper end to the lower end of the water environment; and
causing water traversing the water recirculation path to drive a water-actuatable turbine.

10. The method as recited in claim 9, wherein the vortex generated by the impeller is further sufficient to hinder the communication of water from the water environment into the impeller bore via the impeller outlet end.

11. The method as recited in claim 9, wherein the vortex generated by the impeller is further sufficient to assist in the formation of hydraulic flow activity communicating through the water environment from the lower end to the upper end thereof.

12. The method as recited in claim 9, further includes the steps of:
defining a hydro chamber space in the lower end of the water environment; and
disposing the impeller in the hydro chamber space.

13. The method as recited in claim 9, wherein:
the water recirculation path defines at least in part a change in elevation so that the water traversing the water recirculation path to drive the water-actuatable turbine moves at least in part under the assistance of gravity; and
the ball recirculation path defines at least in part a change in elevation so that any ball traversing the ball recirculation path to drive the ball-actuatable turbine moves at least in part under the assistance of gravity.

14. The method as recited in claim 9, further includes the steps of:
    partitioning the water environment into an upper reservoir space and a lower reservoir space, the lower reservoir space defining a hydro chamber space configured to house the impeller;
    providing a first inverted cone-shaped funnel structure to define a transition between the lower reservoir space and the upper reservoir space; and
    providing a second inverted cone-shaped funnel structure to facilitate the transfer of an ascending ball from the upper reservoir space to the ball recirculation path.

15. The method as recited in claim 14 further includes the steps of:
    using a ball-conveying pipe to define at least in part the ball recirculation path, the ball-conveying pipe having an inlet end disposed in communication with the first funnel structure and an outlet end disposed in communication with the impeller bore at the inlet end thereof;
    configuring the ball-actuatable turbine to be downstream of the inlet end of the ball-conveying pipe;
    using a water-conveying pipe to define at least in part the water recirculation path, the water-conveying pipe having an inlet end disposed in communication with the water environment at the upper end thereof and an outlet end disposed in communication with the water environment at the lower end thereof; and
    configuring the water-actuatable turbine to be downstream of the inlet end of the water-conveying pipe.

16. A power generator system, comprising:
    a water environment including an upper end, a lower end, an upper reservoir space, and a lower reservoir space defining a hydro chamber;
    an impeller housed in the hydro chamber and configured to operably generate a vortex, the impeller having a longitudinal bore extending between an inlet end and an outlet end thereof and defining a ball-communicating passageway, the outlet end of the impeller disposed in fluid communication with the water environment at the lower reservoir space thereof;
    a water-conveyance system configured at least in part to define a fluid-communicating pathway between the upper end and the lower end of the water environment;
    a hydraulically-actuated first turbine configured to be operably actuated by water traversing the fluid-communicating pathway;
    at least one ball;
    a ball-conveyance system configured at least in part to define a ball-communicating pathway between the upper end of the water environment and the impeller bore at the inlet end thereof; and
    a ball-actuated second turbine configured to be operably actuated by any of the at least one ball traversing the ball-communicating pathway;
    wherein the vortex generated by the impeller is effective to assist any ball encountering the impeller at the inlet end thereof to communicate through the impeller bore from the inlet end to the outlet end thereof;
    wherein at least one ball egressing the impeller at the outlet end thereof experiences an ascension through the water environment from the lower reservoir space to the upper reservoir space in response to at least one of buoyancy and the impelling influence of the vortex generated by the impeller.

17. The system as recited in claim 16, wherein the vortex generated by the impeller is effective to assist in the formation of hydraulic flow activity communicating through the water environment from the lower reservoir space to the upper reservoir space.

18. The system as recited in claim 17, wherein the vortex generated by the impeller is effective to hinder the communication of water from the water environment into the impeller bore via the impeller outlet end.

19. The system as recited in claim 16, wherein:
    the ball-communicating pathway defined by the ball-conveyance system includes a ball delivery section disposed at a higher elevation relative to the ball-actuated second turbine; and
    the fluid-communicating pathway defined by the water-conveyance system includes a water delivery section disposed at a higher elevation relative to the hydraulically-actuated first turbine.

20. The system as recited in claim 16, further includes:
    wherein the ball-conveyance system further includes:
        a pipe extending between an inlet end and an outlet end thereof, the pipe inlet end and the pipe outlet end respectively disposed in fluid communication with the water environment at the upper end and the lower end thereof,
        a first ball capture mechanism disposed at least in part within the inlet end of the pipe, the first ball capture mechanism configured to receive any one of the at least one ball ascendant to the upper reservoir space of the water environment and to communicate the reservoir-received ball into the pipe, and
        a second ball capture mechanism disposed proximate the outlet end of the pipe, the second ball capture mechanism configured to receive any one of the at least one ball traversing the pipe and to communicate the pipe-traversing ball into the impeller bore via the impeller inlet end;
    a funnel-shaped divider configured to define a transition between the lower reservoir space and the upper reservoir space; and
    a funnel-shaped ball-guiding arrangement configured to facilitate the transfer of a ball from the upper reservoir space to the ball-conveyance pipe at the inlet end thereof.

* * * * *